(12) United States Patent
Browne

(10) Patent No.: US 11,725,648 B1
(45) Date of Patent: Aug. 15, 2023

(54) WATER TRANSFER MONITORING SYSTEM AND METHOD OF USE

(71) Applicant: Harry Joseph Browne, Kennedale, TX (US)

(72) Inventor: Harry Joseph Browne, Kennedale, TX (US)

(*) Notice: Subject to any disclaimer, the term of this patent is extended or adjusted under 35 U.S.C. 154(b) by 195 days.

(21) Appl. No.: 17/245,850

(22) Filed: Apr. 30, 2021

Related U.S. Application Data

(63) Continuation-in-part of application No. 16/195,328, filed on Nov. 19, 2018, now abandoned, which is a continuation-in-part of application No. 16/050,745, filed on Jul. 31, 2018, now Pat. No. 10,683,716.

(60) Provisional application No. 62/628,983, filed on Feb. 10, 2018.

(51) Int. Cl.
F04B 49/06 (2006.01)
G05D 7/06 (2006.01)
E21B 21/01 (2006.01)
E21B 21/08 (2006.01)

(52) U.S. Cl.
CPC ............ F04B 49/065 (2013.01); E21B 21/01 (2013.01); E21B 21/08 (2013.01); G05D 7/0635 (2013.01)

(58) Field of Classification Search
CPC ........ E21B 21/08; E21B 21/01; E21B 21/106; G05D 7/0635; G05D 9/12
USPC ........................................................ 700/282
See application file for complete search history.

(56) References Cited

U.S. PATENT DOCUMENTS

2016/0032703 A1* 2/2016 Broussard ............... E21B 43/26 166/250.01
2016/0138351 A1* 5/2016 Dillard .................. E21B 21/106 175/25

* cited by examiner

Primary Examiner — Mohammad Ali
Assistant Examiner — Saad M Kabir
(74) Attorney, Agent, or Firm — Leavitt Eldredge Law Firm

(57) ABSTRACT

A water transfer monitoring system includes a meter skid to monitor water flow at a first location along the water transfer line, the meter skid having one or more meter skid sensors to detect and collect data associated with water flow at the first location; a control panel skid configured to receive and implement commands along a water transfer line, the control panel skid having a controller in communication with the one or more meter skid sensors, the controller to implement commands based on data received from the one or more meter skid sensors; the meter skid and the control panel skid are portable and re-usable; and data from the one or more meter skid sensors and the controller is transmitted to a remote data services for operator monitoring.

6 Claims, 9 Drawing Sheets

WATER TRANSFER MONITORING SYSTEM AND METHOD OF USE

BACKGROUND

1. Field of the Invention

The present invention relates generally to oil and gas well drilling and completion systems, and more specifically, to a self-contained and portable skid for automated monitoring and remote control of water transfer equipment and providing notifications to an operator upon detection of abnormal conditions.

2. Description of Related Art

Water transfer systems for oil and gas well drilling are well known in the art and are effective means to transfer water from a water supply to a water storage or well site, wherein the water is used for drilling, cementing, and fracking operations. For example, FIG. 1 depicts a conventional portable pump 110 used for transferring water. System 110 includes a pump 105 run by a motor 107 with a motor controller 120 and a fuel tank 111, wherein the fuel tank 111 may be located on or off a towable trailer 112. System 110 further includes charging system 108 and one or more batteries 109. During use, water is sucked into the pump at an inlet 115 and discharged at higher pressure at 117 enabling transfer of water over long distance.

FIG. 2 depicts a conventional temporary water transfer system 200 having one or more portable pumps 110a-b positioned along a water transfer line 210a-b, wherein the portable pumps 110a-b move water from a water source location 201 to a water storage location 202.

It should be appreciated that additional pumps can be installed along line 210 as needed. For example, a system transferring water from a pond to a well site 12 miles away would have a pump at the pond and then could have booster pumps at locations 3, 6, and 9 miles along the route.

A problem associated with conventional water transfer systems used for temporary supply of drilling, cementing, and fracking operations is frequent equipment malfunction as compared to other permanent industrial water transfer installations. This can be caused by several factors including:

- Temporary transfer lines are often made of less durable materials that facilitate rapid deployment and retrieval at the lowest cost
- Repeated installation and removal of these lines causes wear and tear of material and transfer line connections which can be difficult to detect until the system is operating at full pressure
- The operations often require water transfer over long distances which makes installation of a buried pipeline cost prohibitive for short term use. As a result the water transfer lines are typically laid on bare ground. This exposes the lines to damage from vehicles, livestock, as well as environmental factors such as UV exposure and ambient temperature changes.
- The pumps and transfer lines are often rented which can lead to unreported damage or maintenance issues.

Another problem is due to the temporary nature need for water transfer electric power is often not available or cost prohibitive. This results in the common use of pumps powered by diesel motors which must be periodically refueled in the field.

To minimize downtime or loss of water from these problems, frequent or continuous manual supervision of the water transfer system is typically required during normal operation.

Accordingly, although great strides have been made in the area of water transfer systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
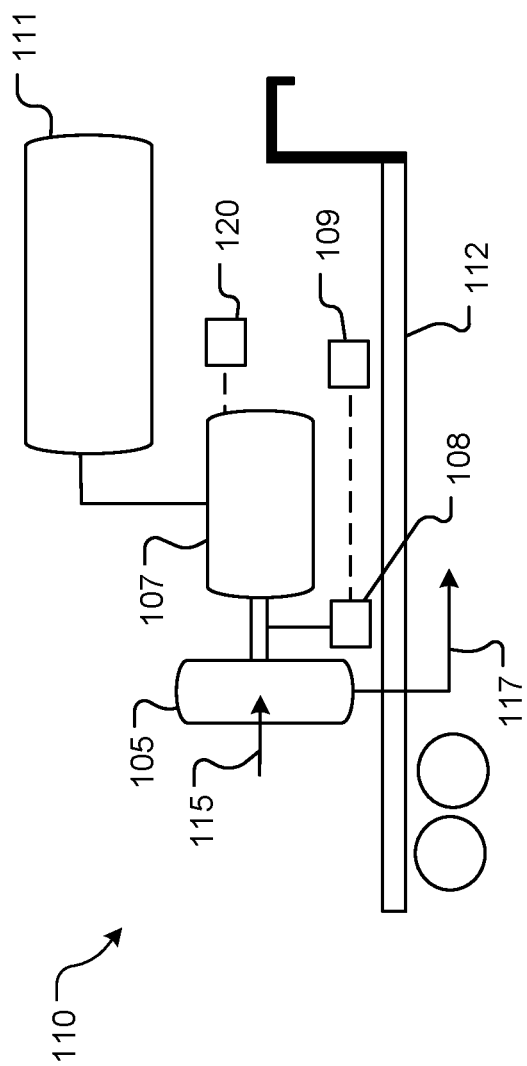
FIG. 1 is a simplified schematic of a common portable pump system.
Figure 2:
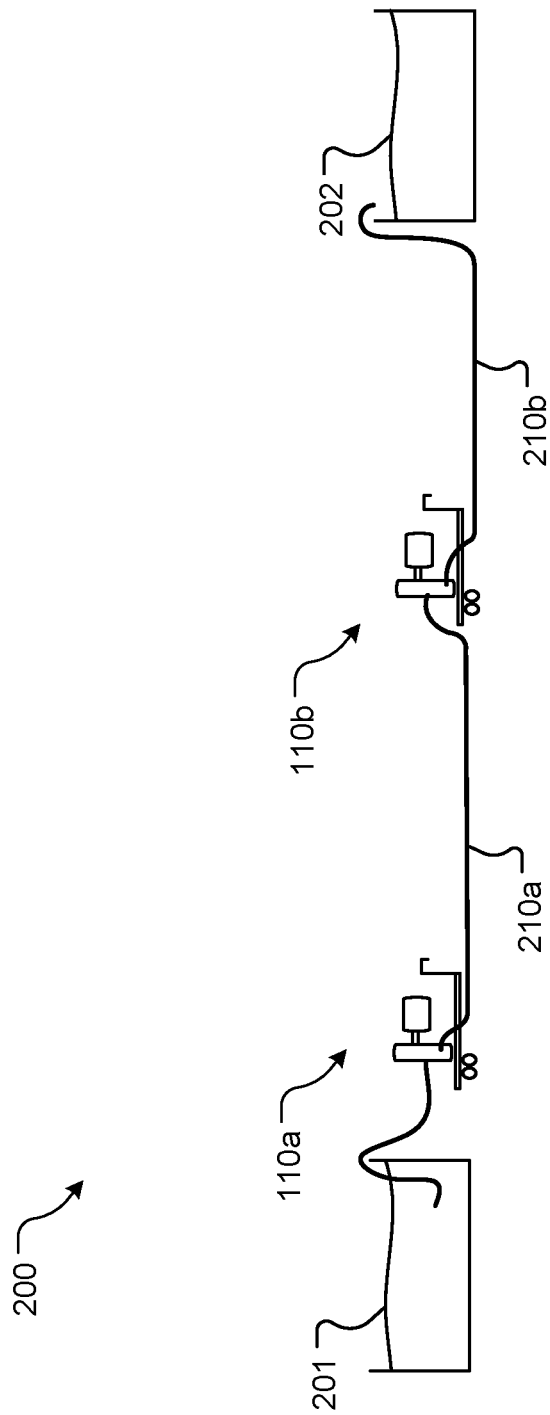
FIG. 2 is a simplified schematic of a conventional temporary water transfer system from a water source to a storage site.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional temporary water transfer systems. Specifically, the present invention provides a means to autonomously monitor and remotely control equipment associated with the water transfer from a water source to a final discharge site. The automated monitoring provides remote notification to an operator when an abnormal condition occurs thereby reducing the need for onsite inspection and supervision during the majority of the time the system is operating normally. The sensors utilized by the present application provide continuous monitoring of the water transfer system from beginning to end. This improves the level of detection that can be provided by manual supervision. This function is achieved via one or more portable skids having a plurality of sensors and control equipment. The pre-fabricated skid is pre-wired and pre-programmed enabling the automated monitoring benefits with minimal onsite installation and removal time. The package is designed to allow all components to be stored within the skid when not in service, and for the operator interface and communications antennae to be folded for compact storage and transportation. The system is designed for low weight in order to be easily loaded and unloaded. The skid design and software are further designed for ease of installation and configuration for short term use. In addition, the equipment and software design enables the skid to be used at any of the three water transfer system locations: supply pump, booster pump, or final discharge. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
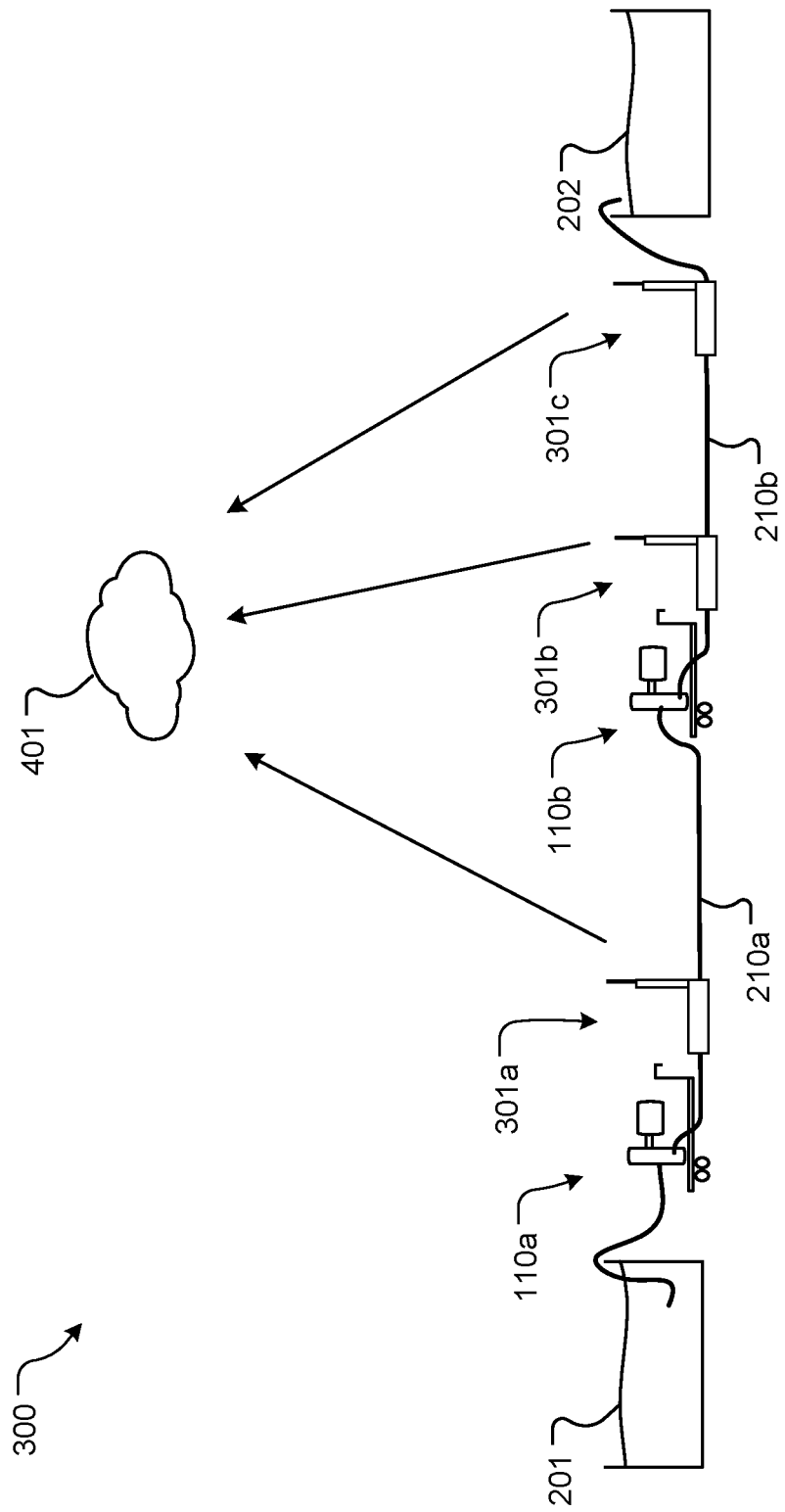
FIG. 3 is a simplified schematic of a water transfer system with a plurality of self-contained and portable skids for monitoring water transfer in accordance with a preferred embodiment of the present application.

Referring now to the drawings wherein like reference characters identify corresponding or similar elements throughout the several views, FIG. 3 depicts a simplified schematic of a water transfer system 300 with one or more self-contained and portable skids 301a-c for monitoring water transfer associated with oil and gas drilling, cementing, and fracking operation in accordance with a preferred embodiment of the present application. It will be appreciated that system 300 with the one or more portable skids 301a-c overcomes one or more of the above-listed problems commonly associated with conventional water transfer monitoring systems.

In the contemplated embodiment, system 300 includes one or more portable water transfer pumps 110a-b, each being in communication with a portable monitoring and remote control skid 301a-b having a plurality of equipment, sensors, wires, and the like, configured to engage with various components of pumps 110a-b, thereby providing a means to automatically receive status and information about the water transfer at a remote location. In addition the skid can be interfaced to a supported motor controller on the transfer pump and provide remote pump control including starting, stopping, speed increase, and speed decrease as well as monitoring of pump engine or motor operating parameters and fault conditions. It should be understood that each skid 301a-c includes common connections for the installation near each pump 110a-b and along water transfer line 210a-b. It should be understood that a final skid 301c is positioned near water storage location 202 for additional monitoring. It should be appreciated that each skid 301a-c includes the same components, however, depending on the location, of installation, not all components will be used for monitoring. In the preferred embodiment, each skid is in wireless communication with a remote data service 401 configured to receive data for remote monitoring and control of the system.

Figure 4:
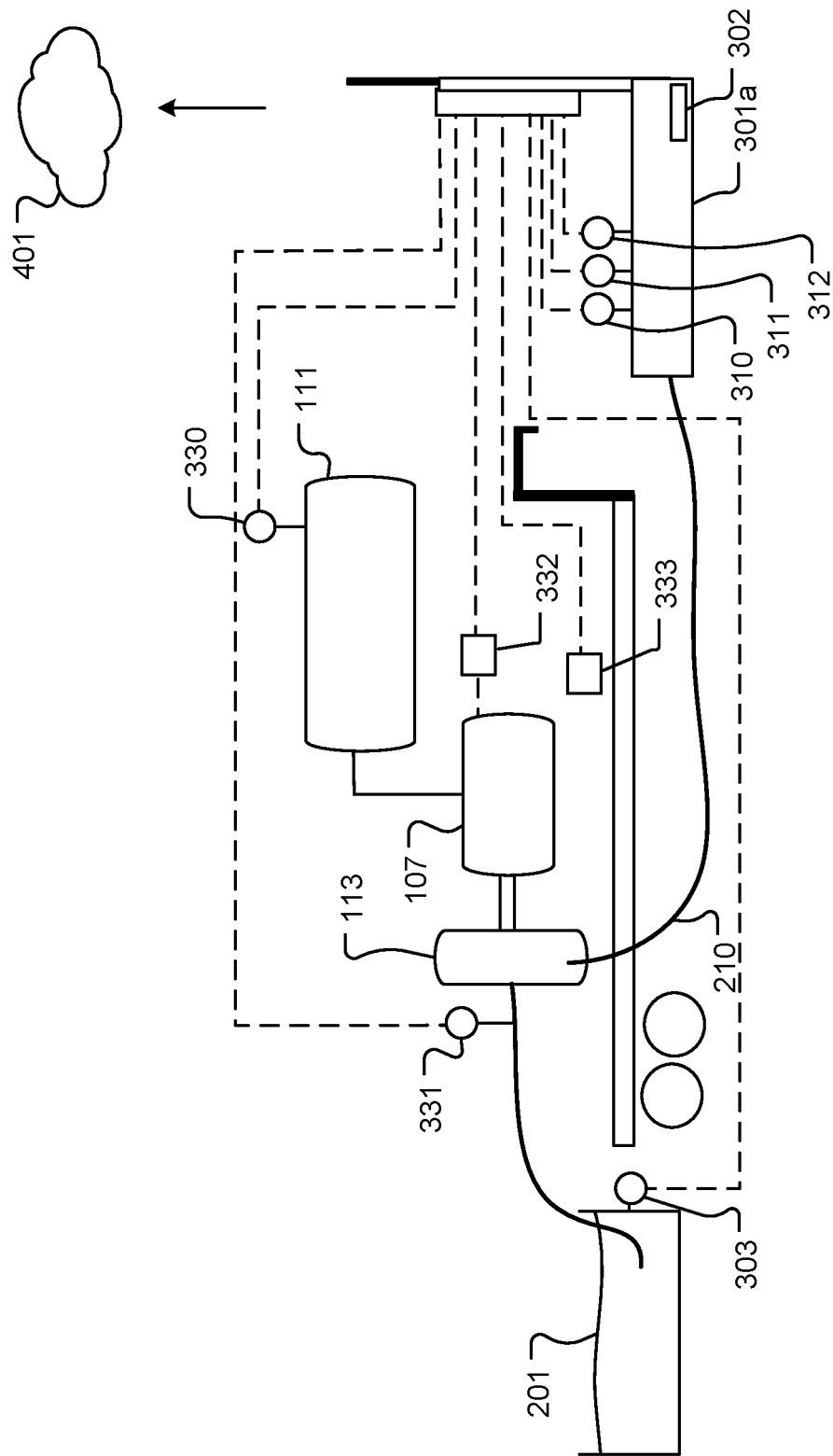
FIG. 4 is a simplified schematic of the components of a self-contained and portable skid configured for the water source location of FIG. 3.
Figure 5:
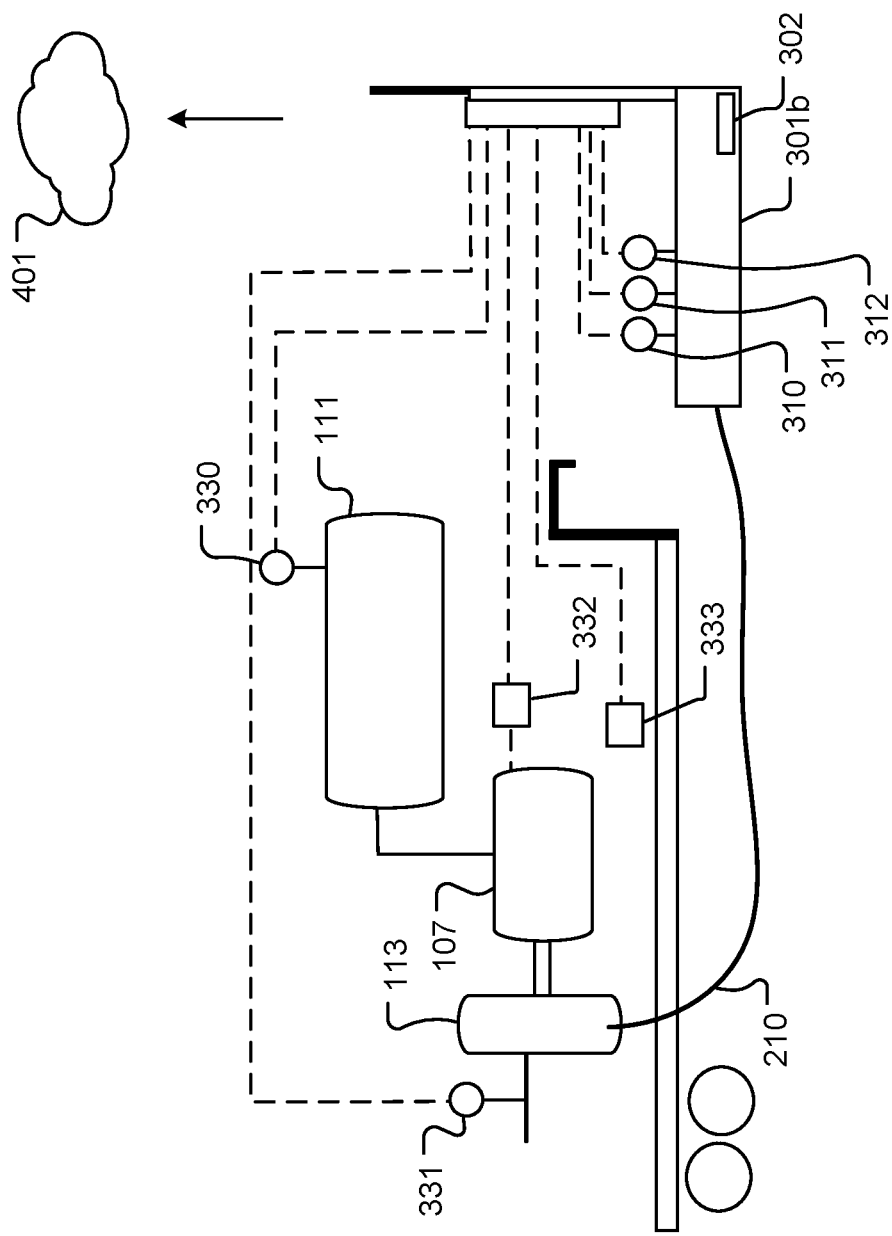
FIG. 5 is a simplified schematic of the components of a self-contained and portable skid configured for the booster pump location of FIG. 3.
Figure 6:
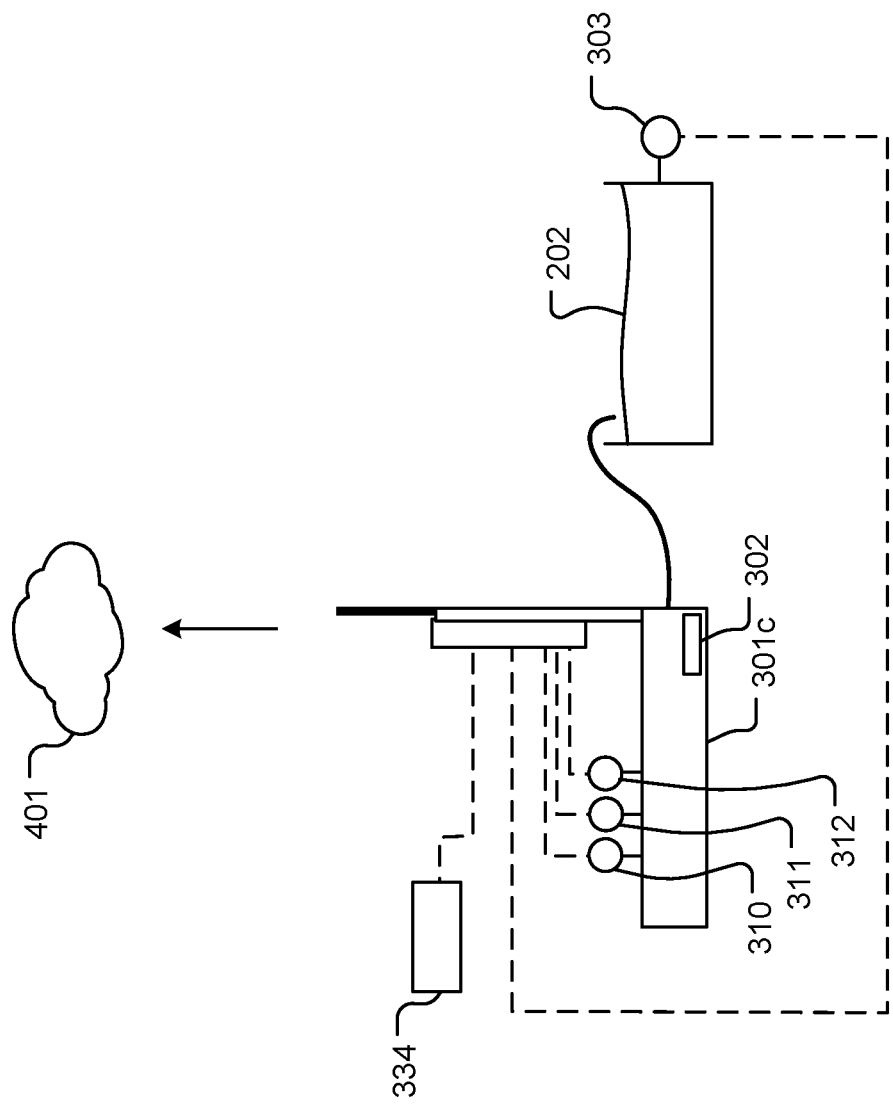
FIG. 6 is a simplified schematic of the components of a self-contained and portable skid configured for the final discharge location in FIG. 3.

The various sensors and equipment associated with a skid 301 are discussed in connection with FIGS. 3-6. FIG. 4 depicts a schematic of a skid 301a to be positioned in connection with the supply pump at a water source. FIG. 5 depicts a schematic of a skid 301b to be positioned in connection with a booster pump along a water transfer line. FIG. 6 depicts a schematic of a skid 301c to be positioned at a final discharge location. It should be appreciated that each skid 301a-c are the same and only vary in which components are used. Each skid 301a-c includes a plurality of sensors and the necessary wiring to connect each sensor to the correct equipment component, thereby providing a cost-effective means for installation, removal, transport, and re-use of the plurality of sensors at temporary water transfer system locations.

In the preferred embodiment, each skid 301 includes a flow rate and totalizer sensor 310 configured to measure the water flowrate in the transfer line. The flowrate value can be used to determine presence of water at a location during initial startup as well as to provide feedback for appropriate adjustment of the pump speed. Flowrate can also indicate flow restrictions such as fouling of the pump intake or frozen water in the transfer line. Calculating the difference in flow rate from two adjacent skids allows for detection of a leak in the water transfer line between them.

Each skid 301 further includes a discharge pressure sensor 311 to be used to verify pump performance compared to the manufacturer's pump curve, as well as insure the allowable operating pressure of the water transfer line is not exceeded. A temperature sensor 312 is configured to alert system operators of freezing temperatures. Appropriate action including draining of equipment or increasing water velocity/flowrate can be taken to avoid equipment damage.

A fuel tank level sensor 330 can provide readings of fuel level in order to alert remote operators prior to running out of fuel. The rate of fuel level change during pump operation along with the volume of the fuel tank can be processed the control system to calculate and display the time remaining before the pump will run out of fuel. This can allow prioritization of fuel deliveries and scheduling to avoid holidays, inclement weather and the like.

A water storage tank level sensor 303 is included to provide data regarding the level of water in a water source 201 for the skid positioned near water source 201 and the level of water in water storage 202 for the skid 301c positioned near the water storage location. These can be used to automatically stop the water transfer pumps or notify a remote operator in the event source water is depleted or the final storage tank is full. It should be appreciated that the various sensors discussed herein, are in communication with a control system of each skid, wherein the various readings can be transmitted to the remote data service 401 for monitoring. The control system can communicate an alarm via email or text message, wherein a pre-determined value of one or more readings will cause the alarm to signal, thereby providing an alert as to an abnormal condition.

In some embodiments, additional features can include a suction pressure sensor 331 configured to measure pump intake pressure. It should be appreciated that said pump intake pressure can be used to verify performance of the pump per the manufacturer's specifications. It can also be used in startup of the system to confirm feed water is present at a booster pump. Lastly, a motor control interface 332 can be incorporated to provide start/stop and speed control of the motor as well as monitoring of engine or motor operating conditions and faults.

The data received from the plurality of sensors is transmitted to the remote monitoring service 401 and can further be monitored via one or more computing devices. It should be appreciated that a platform, such as mobile app, can provide access to the remote data service, wherein an operator can receive notifications regarding the readings, and further transmit commands to various equipment.

In the supply and booster locations (shown in FIGS. 4 and 5), the skids 301a-b receives power from a pump motor battery, wherein the skid 301a-b includes an internal battery 302 to be charged via the pump motor's charging system. At the final discharge location a power generator is used to charge the skid 301 battery since a pump motor is not present. Electric power for battery charging can be generated by a solar panel or a turbine generator driven by the discharge flow when the water transfer system is operating.

In FIG. 6, a simplified schematic demonstrates the features of a skid 301c associated with a final water discharge into a storage location 202. Skid 301c includes all the features discussed in connection with skid 301 in FIG. 4, however, during use of this skid, some of the sensors are not used but remain included. Skid 301c receives power from a generator 334 and includes a storage tank level sensor 303 to determine a fill level of the storage tank. This skid allows for monitoring at the final discharge location of the water line.

Figure 7:
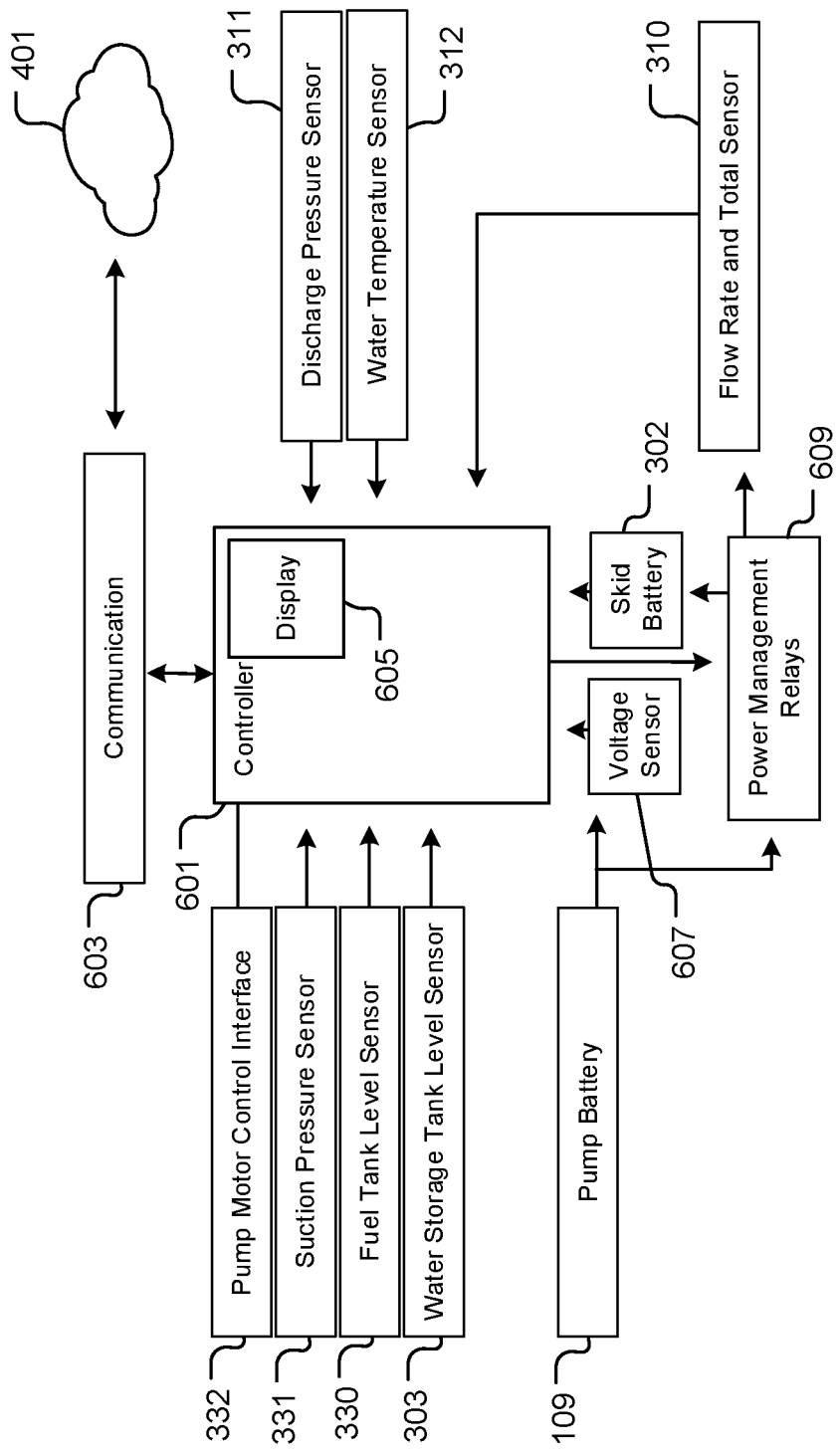
FIG. 7 is a simplified schematic of the components of each of the plurality of self-contained and portable skids of FIG. 3.

In FIG. 7, a simplified schematic further depicts the various sensors discussed herein in connection with a controller 601 configured to receive recordings and data to be communicated 603 to the remote data service 401. Controller 601 includes a display 605 to allow for manipulation and visual monitoring of the various readings and sensors. Motor control interface 332 provides an interface for a user to activate and deactivate the motor. As shown as well as monitor engine or motor operating conditions and faults, the suction pressure sensor 331, fuel tank level sensor 330, optional water storage tank level sensor 303, discharge pressure sensor 311, water temperature sensor 312, and flow rate and total sensor 310 all transmit readings to the controller 601 to be transmitted to the remote data monitoring system.

The various components can receive power from the pump battery 109, configured to charge a skid battery 302, however, the system can further include power management system having a voltage sensor 607 configured to detect the voltage of the diesel pump motor's alternator when running and one or more relays 609 for charging connections to the skid battery and each sensor. The power management system is configured to determine when the pump motor's charging system is running and thereby activate charging of the battery. Similarly, when the voltage sensor detects a lower voltage, relays may be used to de-energize sensors in order to conserve battery power.

It should be appreciated that one of the unique features believed characteristic of the present application is the packing and creation of one or more portable skids 301 configured to be placed in communication with a plurality of components of a standard water pump transfer system, thereby providing a means to automatically monitor various aspects of the water transfer from a water supply to a work site, or final storage location.

It should be understood and appreciated that system, being in wireless communication with a remote data system can provide an operator of notifications relating to 1) low or high flow rate; 2) low or high pump discharge pressure; 3) low or high-water temperature; 4) flow differential or leak detection; 5) loss of communication (poll failure)/dead battery; 6) pump outage due to running out of fuel or mechanical failure; 7) low or high level associated with the supply tank; and 8) low or high level associated with the final discharge tank.

It should be appreciated that multiple skids can be used at various locations along the water transfer system, thereby providing the remote data monitoring system with a plurality of readings at multiple locations, thereby providing ample data to compare for determination of abnormal conditions. It should be understood that the plurality of readings associated with the various sensors, at various locations along the water transfer line, can be viewed and monitored remotely using a computing device, such as a PC, mobile phone, tablet, or the like.

Figure 8:
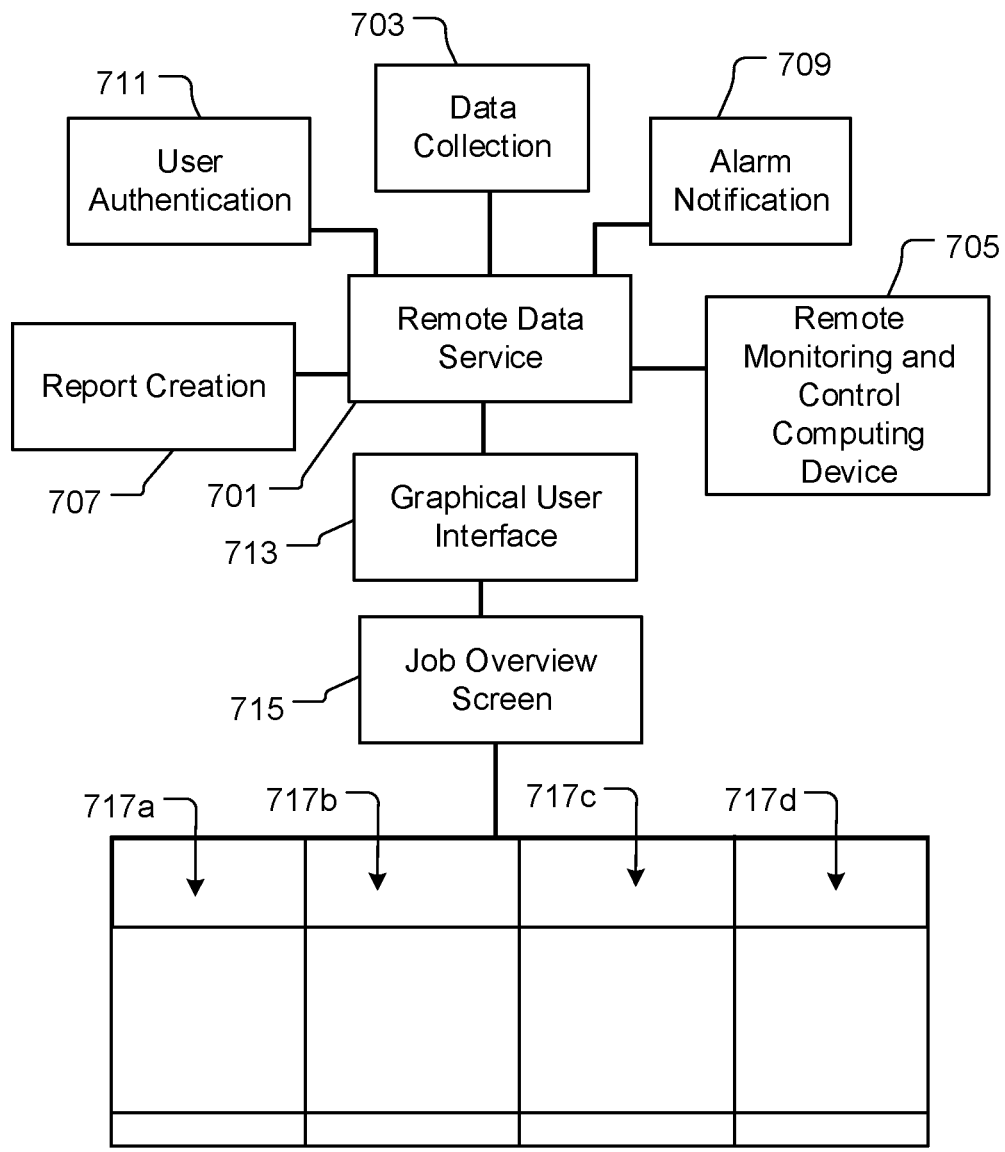
FIG. 8 is a simplified schematic of an embodiment of a remote monitoring and control service in accordance with the present invention.

In FIG. 8 a simplified schematic further shows one contemplated embodiment of a remote data monitoring service 701 configured to receive data 703 from the plurality of sensors. The remote data service can include remote monitoring 705 via a computer, including mobile phones, tablets, and the like, wherein the user can receive created reports 707 and notifications and/or alarms 709 via email, a mobile application, text messages, and the like. Further service 701 can include user authentication 711 to ensure accurate records and monitoring.

In one preferred embodiment, a graphical user interface 713 is included, wherein the user can create and view information, including a job overview screen 715. In one preferred embodiment, the job overview screen 715 includes a fixed number of panels 717a-d. When setting up a job, the operator can configure the panels 717a-d depending on the number of skids needed, wherein each panel 717a-d provides data related to the specified location of the skid associated with said panel. It should be appreciated that once a panel is set, the configuration parameters for the skid, including communication ID, particular sensors enabled, scale values for tank levels, and alarm set points, are entered onto the screen and downloaded to the control system of the corresponding skid. This feature allows for the user to configure the system without programming changes.

Figure 9:
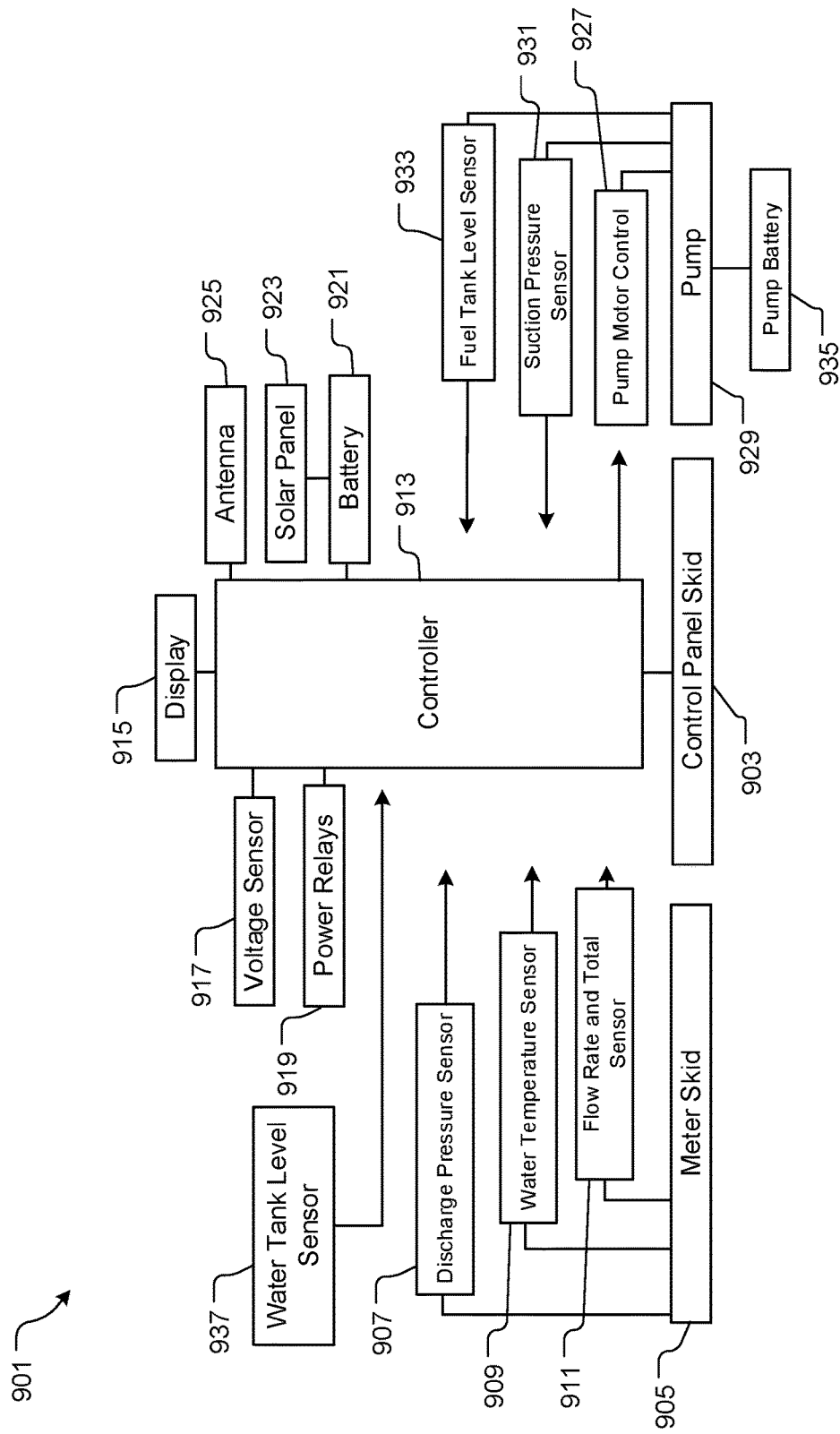
FIG. 9 is a simplified schematic depicting an alternative embodiment of a water transfer monitoring system in accordance with the present invention.

In FIG. 9, a schematic depicts an alternative embodiment of a water transfer monitoring system 901 in accordance with the present application. System 901 may include any of the teachings above. In this embodiment, the necessary components of a water transfer monitoring system are not all contained on a single, self contained skid, but rather on a control panel skid 903 and a meter skid 905. This allows for the end user to easily separate some of the components for convenience as needed.

As shown, the meter skid 905 will include will include the discharge pressure sensor 907, the water temperature sensor 909, and the flow rate and total sensor 911. The plurality of sensors may be changed or implemented as needed by the end user, wherein the sensors will collect and send data to the controller 913 of the control panel skid. The controller 913 operating as discussed above, such that implementation of commands to control the system will occur.

The control panel skid will further include one or more of a display 915, a voltage sensor 917, one or more power relays 919, one or more batteries 921, one or more solar panels 923, and an antenna 925.

Further, as shown, the system may include additional components as discussed above, including the pump motor controller 927 associated with a pump 929, a suction pressure sensor 931, a fuel tank level sensor 933, and a pump battery 935.

As further shown, the controller 913 will be configured to receive data from a water tank level sensor 937. Again, it should be appreciated that the system 901 functions together, wherein additional meter skids and additional control panel skids may be utilized along a water transfer line, thereby allowing for operator control of water flow as discussed above.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A water transfer monitoring system, comprising:
a remote computer;
a water reservoir spaced at a position remote from a worksite;
a water transfer line extending from a first end to a second end, the water transfer line is in fluid communication with the water reservoir at the first end and in fluid communication with the worksite at the second end;
a first skid configured to monitor water flow at a first location along the water transfer line, the first skid having:
one or more skid sensors configured to detect and collect data associated with water flow at the first location;
a control panel skid configured to receive and implement commands one or more devices of the first skid, the control panel skid having:
a controller in communication with the one or more skid sensors, the controller is configured to implement commands based on data received from the one or more skid sensors to the one or more device of the first skid; and
a transceiver in communication with the remote computer;
wherein the controller communicates with the remote computer via the transceiver, which in turn implements commands based on one or more skid sensors;
a second skid positioned at a second location along the water transfer line, the second skid is configured to monitor and control water passing through the water transfer line at the second location;
wherein data from the first skid and the second skid are transmitted to a remote data services for operator monitoring via the remote computer.

2. The system of claim 1, wherein the one or more skid sensors further comprises:
a flowrate sensor configured to measure a first value of water flow rate and total volume associated with the first location;
a discharge pressure sensor configured to measure a value of pump discharge pressure; and
a temperature sensor configured to measure water temperature.

3. The system of claim 1, wherein the control panel skid further comprises:
a display;
a voltage sensor;
one or more power relays;
a battery;
an antenna; and
one or more solar panels.

4. The system of claim 1, wherein the control panel skid and the first skid are separate moveable components.

5. The system of claim 1, wherein the control panel skid and first skid are combined into a single self-contained skid.

6. The system of claim 1, further comprising:
a pump positioned along the water transfer line and configured to receive commands from the controller, the pump further having:
a pump motor controller;
a suction pressure sensor;
a fuel tank level sensor; and
a battery.

* * * * *